Nov. 13, 1934.  J. H. WADE  1,980,605
APPARATUS FOR PASTEURIZING MILK
Filed Aug. 25, 1932
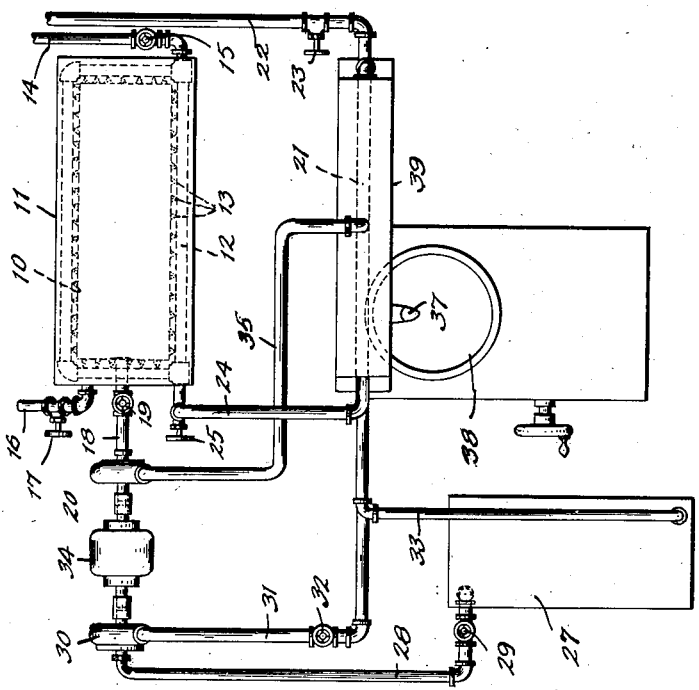
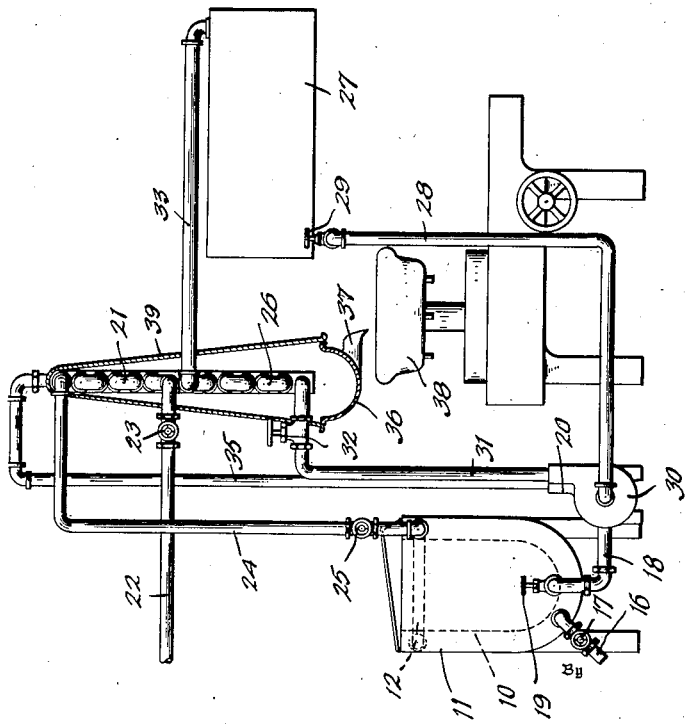
Inventor
JOHN H. WADE
Attorney Patented Nov. 13, 1934

1,980,605

UNITED STATES PATENT OFFICE 1,980,605

APPARATUS FOR PASTEURIZING MILK

John H. Wade, Fairfield, Conn.

Application August 25, 1932, Serial No. 630,446

4 Claims. (Cl. 257—10)

The present invention relates to an apparatus for pasteurizing milk, and has for an object to enable the milk to be pasteurized in a quicker and more effectual manner than heretofore, with less likelihood of bacterial contamination, and further to permit the pasteurizing process to be carried on with a smaller amount of cooling water than has been necessary with previous methods and apparatus.

The usual type of pasteurizer consists of a heating chamber in which the milk is placed and heated by injecting a mixture of steam and water in a jacket about the milk chamber so as to bring the milk to a temperature of approximately 145° F., at which temperature it is held for a period of 30 minutes, or more, and is then rapidly flowed over a cooling apparatus from which it passes into the bottling machine. According to this old method the milk was flowed over the cooling apparatus at approximately its high temperature of 145° and passed from the cooling apparatus to the bottling machine at about 40°. The cooling apparatus usually consisted of an aerator having coils through which water was passed from the city supply line, and also a brine cooler. The city water under this old method was carried directly from the coils to a sewer, or other place of disposal.

It is proposed in the present invention to carry the water from the coils to the milk chamber jacket, flowing it through the same pipes that are used for the heating steam and water, so that the milk in the heating chamber is gradually cooled at the same time it is being flowed over the cooling apparatus, with the result that there is a quicker cooling and transmission of the milk to the bottling machine, with less likelihood for bacterial contamination, and at the same time there is a considerable reduction in the amount of water necessary to cool a given quantity of milk in a given time period. In practice it has been found that only about half the amount of water will be required as heretofore. Inasmuch as the city water is used in relatively large quantities, and is usually metered, this large reduction in the amount of water used represents a considerable saving in the cost of pasteurizing.

With the above and other objects in view an embodiment of the invention is shown in the accompanying drawing, and this embodiment will be hereinafter more fully described with reference thereto, and the invention will be finally pointed out in the claims.

In the drawing:

Fig. 1 is a side elevation of a pasteurizing apparatus according to the illustrated exemplary embodiment of the invention.

Fig. 2 is a plan view thereof.

Similar reference characters indicate corresponding parts throughout the several figures of the drawing.

Referring to the drawing, the pasteurizing apparatus, according to the illustrated exemplary embodiment of the invention, comprises a milk receiving tank 10 surrounded at its sides and bottom by an outer jacket wall 11 providing a space about the tank into which the heating and cooling media are introduced. For this purpose a pipe 12 is mounted in the upper portion of the jacket space in surrounding relation to the tank and is provided with jet openings 13 directed toward the walls of the tank. At one point the pipe 12 is connected to a heating medium supply pipe 14 provided with a shut-off valve 15, and through which the heating medium, preferably a mixture of steam and water is supplied. A drain pipe 16 having a valve 17 is provided at the bottom of the jacket wall.

A draw-off pipe 18 having a valve 19 is provided at the bottom of the milk tank 10 and extends to a milk pump 20, from which the milk is pumped to the cooling apparatus, as will presently more fully appear.

The cooling apparatus, which is preferably of the type known as an aerator, consists of a coil 21 arranged vertically to which cold water is supplied from the city supply by a pipe 22 having a valve 23. As the water completes its flow through the coil 21 it is carried by a pipe 24 to the milk tank, being connected to the jet pipe 12 and provided adjacent the milk tank with a valve 25.

Below the coil 21 there is provided a brine cooler in the form of a coil 26, to which brine is flowed from the brine tank 27 by a pipe 28 having a valve 29, a brine pump 30, and a pipe 31 having a valve 32, and being carried back to the brine tank by a return pipe 33. The milk pump 20 and brine pump 30 are both driven by the same motor 34 mounted between them.

A pipe 35 extends from the milk pump 20 to the upper end of the cooling apparatus, the milk flowing downwardly therefrom over the water and brine coils into a trough 36, from which it flows through a spout 37 into the bottling apparatus 38. The cooling apparatus is preferably enclosed in a jacket 39, and the coils may be sheathed, or enclosed, in any of the usual ways.

The operation of my improved pasteurizing apparatus is as follows:—

The raw milk is poured into the tank 10 and heated by injecting a mixture of steam and water into the jet pipe 12 through the supply pipe 14, the cooling apparatus being inoperative at this stage and the valve 25 being closed. The milk, which is constantly stirred by any suitable paddle apparatus is brought to a temperature of approximately 145° F., at which temperature it is held for 30 minutes or more, when it is ready for cooling. At this point the valve 15 is closed and cooling water is flowed from the city supply throughout the aerating coil 21, and is flowed from this coil through the pipe 24 to the jet pipe 12, the valves 25 and 17 being open. At the same time the brine cooler is operated through operation of the pump 30. The milk is carried from the tank 10 to the cooling apparatus through opening of the valve 19 and operation of the pump 20, which forces the milk upwardly through the pipe 35 to the upper end of the cooling apparatus over which it flows by gravity. The injecting of the cooling water from the coil 21 into the space about the milk tank gradually cools the milk in the milk tank at the same time that it is being flowed over the cooling apparatus, so that the milk in the tank undergoes a gradual reduction in temperature prior to its contact with the coil 21, and throughout the whole process from approximately 145° to about 80°. As the milk flows from the cooling to the bottling apparatus it is at approximately 40°. Inasmuch as a considerable portion of the cooling is accomplished in the milk chamber there is a proportionate reduction in the amount of water necessary to be flowed through the cooling coils 21, and also a smaller amount of ice will be required in the brine cooler as the milk will be at a relatively lower temperature than heretofore as it flows over the brine cooler.

It has been found in practice that when operating the apparatus during the same time period as previous apparatus for a given quantity of milk a saving of approximately half in the amount of city water used is effected. It has also been found by increasing the amount of water the cooling process may be proportionately speeded up, so that the same quantity of milk may be pasteurized in a much shorter time than has been possible with previous apparatus.

It will be understood that my improvements may be embodied in pasteurizing apparatus employing other types of tanks, and heating and cooling elements than those illustrated.

I have illustrated and described a preferred and satisfactory embodiment of the invention, but it will be obvious that changes may be made therein within the spirit and scope thereof, as defined in the appended claims.

Having thus described my invention, what I claim and desire to secure by Letters Patent is:—

1. In pasteurizing apparatus, a liquid receptacle, heat exchange means associated with said receptacle for introducing a heating medium into relation with the liquid to bring all of the liquid therein simultaneously to a given temperature, means for cutting off said heating medium, a cooling element, means for supplying cold water to said cooling element, means for gradually carrying the liquid from said receptacle to and flowing it in relation to said cooling element, a pipe from said cooling element to said heat exchange means whereby the cooling water is carried from said cooling element into cooling relation with the liquid in said receptacle to simultaneously cool the remaining liquid therein as it is gradually taken therefrom and flowed in relation to said cooling element, and means for cutting off said pipe from said heat exchange means.

2. In pasteurizing apparatus, a liquid receptacle, heat exchange means associated with said receptacle for introducing a heating medium into relation with the liquid to bring all of the liquid therein simultaneously to a given temperature, means for cutting off said heating medium, a cooling coil, means for supplying cold water to said cooling coil, means for gradually carrying the liquid from said receptacle to and flowing it over said cooling coil in exposed relation to the air, a pipe from said cooling coil to said heat exchange means whereby the cooling water is carried from said coil into cooling relation with the liquid in said receptacle to simultaneously cool the remaining liquid therein as it is gradually taken therefrom and flowed over said cooling coil, and means for cutting off said pipe from said heat exchange means.

3. In pasteurizing apparatus, a liquid receptacle, a jacket surrounding said receptacle, means for introducing a heating medium in said jacket, means for cutting off said heating medium, a cooling coil, means for supplying cold water to said cooling coil, means for gradually carrying the liquid from said receptacle to and flowing it over said cooling coil in exposed relation to the air, and a pipe from said cooling coil to said jacket whereby the cooling water is carried from said coil about said receptacle to simultaneously cool the remaining liquid therein as it is gradually taken therefrom and flowed over said cooling coil, and means for cutting off said pipe from said jacket.

4. In pasteurizing apparatus, a liquid receptacle, a jacket surrounding said receptacle, a pipe in said jacket having jet openings for directing heating and cooling media about said receptacle, valve controlled means for introducing heating medium to said pipe to bring all of the liquid therein simultaneously to a given temperature, a cooling coil, means for supplying cold water to said cooling coil, means for gradually carrying the liquid from said receptacle to and flowing it over said cooling coil in exposed relation to the air, and a valve controlled pipe from said cooling coil to said first mentioned pipe whereby the cooling water is carried from said coil and directed about said receptacle to simultaneously cool the remaining liquid therein as it is gradually taken therefrom and flowed over said cooling coil.

JOHN H. WADE.